UNITED STATES PATENT OFFICE.

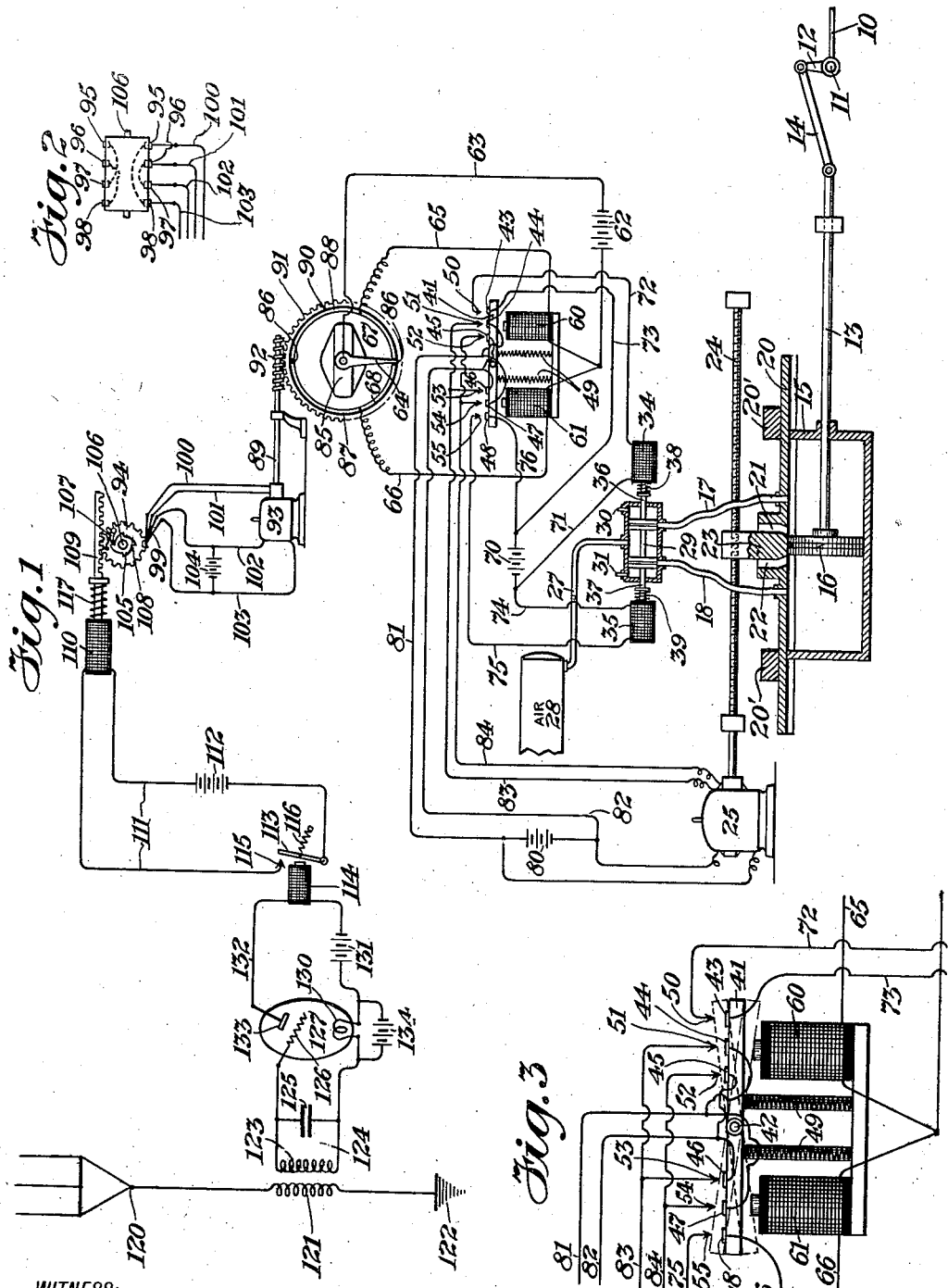

JOHN HAYS HAMMOND, JR., OF GLOUCESTER, MASSACHUSETTS.

STEERING CONTROL.

1,398,510.  Specification of Letters Patent.  Patented Nov. 29, 1921.

Application filed March 29, 1918, Serial No. 225,524. Renewed April 15, 1921. Serial No. 461,679.

*To all whom it may concern:*

Be it known that I, JOHN HAYS HAMMOND, Jr., a citizen of the United States, and a resident of Gloucester, county of Essex, State of Massachusetts, have invented certain new and useful Improvements in Steering Control, of which the following is a specification.

Some of the objects of the present invention are to provide means for steering a movable body by radiant energy; to provide means operable from a distance to gradually move the steering means of a movable body to cause the latter to respond and move in a predetermined direction; to provide means subject to impulses of radiant energy in such a manner that the movable body may be deflected through relatively small angles and the tendency to shift suddenly and through large angles is reduced to a minimum.

In the accompanying drawings, Figure 1 is a diagrammatic representation of steering mechanism embodying the present invention; Fig. 2 a fragmentary side elevation of a portion of the same; and Fig. 3 an enlarged fragmentary side elevation of another portion of the same.

Referring to the drawings, one form of the invention is here shown by which the rudder 10 is controlled automatically or at will from a distance by radiant energy. The rudder post 11 has fixed thereto an arm 12 which is connected to the slidable piston rod 13 by the link 14. The ends of the link 14 are, of course, pivoted to permit proper movement of the parts. The rod 13 passes within the cylinder 15 and terminates in a piston 16 which is adapted to reciprocate under the action of motive fluid admitted to the said cylinder under pressure, by way of the flexible pipes 17 and 18. These pipes communicate with the cylinder at opposite sides of the piston 16 and are secured to a slide valve element 20 mounted to reciprocate longitudinally in an opening provided therefor through the side wall of the cylinder 15 so that the opening and closing of the exhaust ports 21 and 22 depend upon the position of the piston 16 with respect to the slide element 20. The inner surface of the valve element 20 is transversely concave and of the same radius of curvature as and flush with the inner curved surface of the cylinder 15. The outer surface of the valve element is flat and parallel to the longitudinal axis of the cylinder 15 and is arranged to slide against two fixed guides 20′. In the present instance the slide element is actuated by a leader nut 23 fixed to the element 20 and in threaded engagement with the feed screw 24. This screw 24 is journaled in suitable bearings secured to a fixed part and is formed as a continuation of the driven shaft of the motor 25. The supply of pressure fluid to the pipes 17 and 18 is controlled by an electromagnetically operated pilot valve 26 interposed between the pipes 17 and 18 and the main supply pipe 27 which leads from a suitable source of pressure fluid such as compressed air in the tank 28.

The pilot valve 26 is of well known construction consisting of a movable double valve element 29 which alternately opens and closes communication between opposite ends of the valve cylinder and the main supply pipe 27 and between the cylinder ends and the respective exhaust ports 30 and 31. The valve element 29 is operated and the direction of its movement selectively controlled by the solenoids 34 and 35 arranged in opposed relation and having armature cores 36 and 37 forming extensions of the valve element 29. Suitable springs 38 and 39 serve respectively to return and maintain the valve in neutral position when the solenoids are deënergized.

The mechanism by which the solenoids are preferably selectively energized according to requirements consists of a switch bar 41 in the form of an armature pivoted at a point 42 between two series of contacts fixed to the said bar. Two springs 49 keep the armature in a horizontal position. In the present instance there are three contacts 43, 44 and 45 forming one series, and three contacts 46, 47 and 48 forming the other series, and juxtaposed with respect to the several contacts are two series of fixed terminals made up respectively of the contact points 50, 51 and 52 in one series opposed to the respective contacts 43, 44 and 45, and the contact points 53, 54 and 55 in the other series opposed to the respective contacts 46, 47 and 48. The tilting of the bar 41 to close one series of contacts or the other with the opposed terminal contact points is effected by electromagnets 60 and 61 respectively mounted in operative relation to the ends of the armature bar and operative, when one or the other is energized, to tilt the bar 41 and close one set of circuits in the required manner. These magnets 60 and 61 are in circuit with the battery 62 and conductor 63 leading to the contact arm 64 and have separate conductors 65 and 66 leading respectively to the contact segments 67 and 68 of a gyroscope mechanism to be hereinafter described.

The circuits controlled by the pivoted armature bar 41 include the solenoid circuits comprising the battery 70, common to both solenoids 34 and 35, the one circuit consisting of conductor 71 connected to one side of the battery 70 and to the solenoid coil 34; conductor 72 leading from solenoid coil 34 to terminal point 50 and conductor 73 leading from contact 43 back to the other side of the battery 70, and the other circuit consisting of conductor 74 connected to one side of the battery 70 and to the solenoid coil 35; conductor 75 leading from solenoid coil 35 to terminal point 55; and conductor 76 leading from contact 48 to the other side of the battery 70. The remaining circuits controlled by the bar 41 control the field and armature windings of the motor 25 to rotate the feed screw 24 in one direction or the other according to requirements. Thus the field circuit includes the source of current 80, the conductor 81 leading to the bar contacts 44 and 47 and the conductor 82 leading to the bar contacts 45 and 46, while the armature circuit comprises the conductor 83 leading to the terminal points 51 and 53 and the conductor 84 leading to terminal points 52 and 54.

It will thus be evident that the connections are such as to reverse the direction of the armature current as the bar 41 is tilted from one set of contacts to the other, with the result that the feed screw 24 rotates to advance the leader nut 23 and shift the slide valve 20 to meet the desired condition.

The main automatic control for governing the movement of the bar 41 resides, in the form of the invention here shown, in a gyroscope 85 by which the arm 64 is held fixed in space by the action of the gyroscope and rests upon one of the insulation blocks 86 between the contact segments 67 and 68, when the boat or other movable body is moving in a predetermined path.

The contact segments 67 and 68 are mounted to move with the azimuth ring 90 though insulated therefrom as will be understood, so that separate circuits are closed when the arm 64 contacts with either segment 87 or 88. The azimuth ring 90 is provided with a gear 91 for the purpose of turning the ring mechanically when the movable body is to be steered at will from a distance by radiant energy. The mechanism for accomplishing this end consists, in the present instance, of a worm 92 in mesh with the gear 91 and driven by the shaft 89 of the electric motor 93 which is controlled by a rotary commutator 94 consisting of a cylinder having two pairs of armature contacts 95 and 96 and two pairs of field contacts 97 and 98. One pair of armature contacts and one pair of field contacts in each set of contacts are arranged in alinement parallel to the axis of the commutator, and the two sets with respect to each other are spaced one hundred and eighty degrees apart upon the periphery of the commutator so that as the commutator rotates the two series of contacts alternately contact with the brushes 99 in circuit with the respective conductors 100 and 101 of the motor armature circuit and conductors 102 and 103 of the motor field circuit. The motor 93 is energized by a battery 104 or other source of current connected across the conductors 102 and 103.

The commutator 94 serves to close the motor circuit as desired and to reverse the direction of the armature current so that the worm 92 may be rotated in either direction. For this latter purpose one series of field and armature contacts has the armature contact 95 connected to field contact 97 and armature contact 96 to field contact 98, while the other series has the armature contact 95 connected to field contact 98 and armature contact 96 connected to field contact 97. Preferably the commutator is rotated by a step by step motion produced by a ratchet 105 fixed to the commutator shaft 106 and adapted to be driven by a pawl 107 upon the gear 108 which is loosely mounted on shaft 106. This gear 108 is actuated by a rack 109 which forms a part of the armature of a solenoid 110 which is in the normally open circuit including the conductors 111, battery 112 and armature 113 of the relay 114. The armature 113 is normally held out of engagement with the terminal 115 by a spring 116 and a spring 117 also acts to return the rack armature 109 to its normal position when the solenoid is deënergized.

The ratchet 105 is adapted to rotate the commutator ninety degrees at each operation of the rack 109 and consequently the motor 93 has alternate periods of rest and motion.

The relay 114 is adapted to be actuated by an apparatus sensitive to impulses of radiant energy received by the antenna or open aerial circuit 120 in series with the primary coil 121 which is grounded at 122. The secondary coil 123 of the coil 121 is in the closed oscillatory circuit 124, having the variable condenser 125, and connected at one terminal to the grid 126 of a detector 127, here shown as of the evacuated glass bulb type, while the other terminal passes by way of the detector filament 130 to the battery 131. The conductor 132 includes the relay 114 and has its ends connected respectively to the detector plate 133 and the battery 131. The battery 134 is in a local normally closed circuit including the filament 130 and by which the latter is maintained properly heated. It will be understood that the primary oscillatory circuit is tuned to the natural frequency of oscillation of the open aerial circuit.

For the purpose of describing the operation it will be assumed that the hereinbefore described system of steering control is mounted upon a dirigible torpedo, or other marine vessel, or an aircraft or other movable body, and that the steering of the movable body is to be accomplished at will from a distant point. Now when the receiving apparatus receives an impulse of radiant energy the circuit including the relay 114 is closed through the detector 127 and the relay thus energized to actuate the armature 116 and close the circuit to energize the solenoid 110. In consequence the armature rack 109 causes the commutator to turn through ninety degrees and bring one set of contacts into contact with the brushes 99. Assuming for purposes of illustration that the boat or other movable body upon which this improved system is mounted, is to be steered to the left, the set of contacts closed causes the motor to rotate in a direction to turn the azimuth ring 90 in a clockwise direction, thus making contact between the arm 64 and segment 67. The circuit through magnet 60 is thereby closed, the magnet energized, and the tilting armature bar 41 moved to close the set of contacts shown at the left in Fig. 1, so that the motor 25 is rotated to move the slide valve 20 to the right and at the same time the solenoid 35 is energized to shift the pilot valve 29 to admit pressure fluid from supply 28 to pipe 18. The slide valve 20 moving relative to the piston 16 closes exhaust port 22 and the pressure then moves piston 16 and rod 13 to the right, thereby shifting the rudder 10 or like steering mechanism to the left whereby the movable body is deflected to the left.

It will be understood that following the actuating impulse the armature rack 109 is returned to its normal position by the spring 117 so that when a second impulse again closes the circuit of solenoid 110, the said rack again gives a step movement to the commutator through an arc of ninety degrees, this time bringing the brushes 99 to rest on the insulated portion of the commutator so that the motor 93 stops. The boat will then keep on turning until the arm 64 rests upon the insulation 86, when the electromagnet 60 will be deënergized and the switch bar 41 will return to a horizontal position under the action of the springs 49. This will stop the motor 25, and the valve 29 will also return to a neutral position under the action of the springs 38 and 39. The motion of the piston 16 will also be stopped, and, therefore, the rudder will come to rest. The boat will now overrun this position due to the fact that the rudder is still to the left of the arm 64, held fixed in space by gyroscope 85. This arm 64 will, therefore, make contact with the segment 68, thereby energizing the solenoid 61 and causing the switch bar 41 to be depressed on the left side, which will close the three contacts on the right side of said bar. This will cause the motor 25 to rotate in the opposite direction, thus moving the valve 20 to the left. At the same time the solenoid 34 will be energized, which will allow the pressure fluid to pass from the container 28 through valve 26 and pipe 17 to the right hand side of the cylinder 15, thereby moving the rudder 10 to the right to cause the boat to return to the course fixed by the position of the azimuth ring 90 and the arm 64, which is held fixed in space by the gyroscope 85. In this manner the boat will gradually be returned to said course after a number of oscillations diminishing in amplitude. A following impulse may then step the commutator through another ninety degrees to bring the second set of contacts into contact with the brushes, whereupon the motor 93 is rotated in the opposite direction and the reverse of the foregoing operation takes place, so that the slide valve 20 is moved to the left and pressure fluid admitted to move piston 16 to the left and consequently shift the rudder to the right.

From the foregoing it will be apparent that the movable body may be steered at will in either direction since all that is necessary is to send the required number of impulses to bring the commutator to the required position to close the proper circuits controlling the motor 25 and the selected solenoid of the pilot valve 26. The circuits closed are determined by which of the magnets 60 or 61 is energized, and these in turn are selected by causing the ring 90 to turn clockwise or counter-clockwise according to requirements. Furthermore it will be apparent that the gyroscope action to automatically steer the body is free to operate independently when impulses are not being sent, since any deviation of the body from its course will cause one segment 67 or the other 68 to close contact with arm 64, which is fixed in space, and thus operate the steering control to correct the deviation in the required manner.

It will also be apparent that the present rudder shifting means operates to move the rudder gradually instead of giving a quick throw which causes a too sudden movement of the body and increases the tendency to a greater deviation than is required.

By providing a means to move the rudder relatively slowly and gradually a more accurate and sensitive control of the moving body is obtained and steering may be accomplished through very small angles.

Having thus fully described this invention, I claim:

1. In a steering mechanism, a cylinder, a piston mounted in said cylinder for reciprocating movement, a rudder operatively connected to said piston, and means including an exhaust port to gradually build up a pressure at one side of said piston to cause said piston to move gradually to shift said rudder.

2. In a steering mechanism, a cylinder, a piston mounted in said cylinder for reciprocating movement, a rudder operatively connected to said piston, and gyroscope controlled means including an exhaust port to gradually build up a pressure at one side of said piston to cause said piston to move gradually to shift said rudder.

3. In a steering mechanism, a cylinder, a piston mounted in said cylinder for reciprocating movement, a rudder operatively connected to said piston, and means controlled by radiant energy to gradually build up a pressure at one side of said piston to move said piston to gradually shift said rudder, said means including an exhaust port.

4. In a steering mechanism, a cylinder, a piston mounted in said cylinder for reciprocating movement, a rudder operatively connected to said piston, means including a plurality of exhaust ports to gradually build up a pressure at one side or the other of said piston, and selectively controlled means for introducing said pressure to either side of said piston whereby said rudder is gradually moved in either direction according to requirements.

5. In a steering mechanism, a cylinder, a piston mounted in said cylinder for reciprocating movement, a rudder operatively connected to said piston, means including a plurality of exhaust ports to gradually build up a pressure at one side or the other of said piston, and means controlled by radiant energy for selectively introducing said pressure to either side of said piston whereby said rudder is gradually moved in either direction according to requirements.

6. In a steering mechanism, a cylinder, a piston mounted in said cylinder for reciprocating movement, a rudder operatively connected to said piston, means including a plurality of exhaust ports to gradually build up a pressure at one side or the other of said piston, and a gyroscope controlled means for automatically and selectively introducing said pressure to either side of said piston whereby said rudder is gradually moved in either direction according to requirements.

7. In a steering mechanism, a cylinder, a piston mounted in said cylinder for reciprocating movement, a rudder operatively connected to said piston, means including a plurality of exhaust ports to gradually build up a pressure at one side or the other of said piston, a gyroscope controlled means for selectively introducing said pressure to either side of said piston, and radiant energy controlled means for operating said gyroscope means whereby said rudder is gradually moved in either direction according to requirements.

8. In a steering mechanism, a cylinder, a piston mounted in said cylinder for reciprocating movement, a rudder operatively connected to said piston, a valve element slidably mounted upon said cylinder and having a plurality of inlet and exhaust ports, said exhaust ports being adapted to be opened and closed by said piston and all of said exhaust ports being normally open, a source of pressure fluid connected to said inlet ports, means to selectively control the pressure fluid to said inlets, and means to shift said slidable valve element to gradually close the exhaust port which operates in conjunction with the selected inlet whereby the pressure is gradually built up on a predetermined side of said piston to cause said piston to move gradually to shift said rudder according to requirements.

9. In a steering mechanism, a cylinder, a piston mounted in said cylinder for reciprocating movement, a rudder operatively connected to said piston, a valve element slidably mounted upon said cylinder and having a plurality of inlet and exhaust ports, said exhaust ports being adapted to be opened and closed by said piston and all of said exhaust ports being normally open, a source of pressure fluid connected to said inlet ports, a gyroscope, means selectively operated by said gyroscope for controlling the pressure fluid to said inlets, and means to shift said slidable valve element to gradually close the exhaust port which operates in conjunction with the selected inlet whereby the pressure is gradually built up on a predetermined side of said piston to cause said piston to move gradually to shift said rudder according to requirements.

10. In a steering mechanism, a cylinder, a piston mounted in said cylinder for reciprocating movement, a rudder operatively connected to said piston, a valve element slidably mounted upon said cylinder and having a plurality of inlet and exhaust ports, said exhaust ports being adapted to be opened and closed by said piston and all of said exhaust ports being normally open, a source of pressure fluid connected to said inlet ports, a gyroscope, means selectively operated by said gyroscope for controlling the pressure fluid to said inlets, means controlled by radiant energy for operating said gyroscope, and means to shift said slidable valve element to gradually close the exhaust port which operates in conjunction with the selected inlet whereby the pressure is gradually built up on a predetermined side of said piston to shift said rudder according to requirements.

11. In a steering mechanism, a cylinder provided with an inlet port and an exhaust port, a piston mounted in said cylinder for reciprocating movement, a rudder operatively connected to said piston, said ports being on the same side of said piston, controlled means for admitting pressure through said inlet port to shift said piston, and means to gradually close said exhaust port, whereby the escape of the operating pressure fluid is cut off and the pressure in said cylinder gradually increased.

12. In a steering mechanism, a cylinder, a piston mounted in said cylinder for reciprocating movement, a rudder operatively connected to said piston, a slide valve mounted to move axially of said cylinder and having inlet and exhaust ports communicating with said cylinder, said exhaust ports being controlled by said piston, means for admitting pressure fluid to a predetermined end of said cylinder, and means for moving said valve relative to said piston to close the exhaust port at said cylinder end, whereby said piston is moved gradually in the required direction.

13. In a steering mechanism, a cylinder, a piston mounted in said cylinder for reciprocating movement, a rudder operatively connected to said piston, a slide valve mounted to move axially of said cylinder and having inlet and exhaust ports arranged to communicate with said cylinder, said exhaust ports being arranged to be controlled by said piston, means controlled from a distance for admitting pressure fluid to a predetermined end of said cylinder, and selective controlled means for moving said slide valve relative to said piston to close the exhaust port at said cylinder end, whereby said piston is moved gradually in the required direction to operate said rudder.

Signed at New York, in the county of New York and State of New York, this 23d day of March, A. D. 1918.

JOHN HAYS HAMMOND, Jr.